(12) United States Patent
Brinz et al.

(10) Patent No.: US 12,420,511 B2
(45) Date of Patent: Sep. 23, 2025

(54) FILLING UNIT FOR A ROTARY PRESS AND A METHOD FOR PROVIDING AN OPTIMIZED ROTARY PRESS

(71) Applicant: Syntegon Technology GmbH, Waiblingen (DE)

(72) Inventors: Thomas Brinz, Bissingen an der Teck (DE); Fabian Werner, Waiblingen (DE); Torsten Grass, Urbach (DE); Matthias Mössinger, Großerlach (DE)

(73) Assignee: Syntegon Technology GmbH, Waiblingen (DE)

( * ) Notice: Subject to any disclaimer, the term of this patent is extended or adjusted under 35 U.S.C. 154(b) by 178 days.

(21) Appl. No.: 18/249,650

(22) PCT Filed: Oct. 6, 2021

(86) PCT No.: PCT/EP2021/077511
§ 371 (c)(1),
(2) Date: Apr. 19, 2023

(87) PCT Pub. No.: WO2022/084035
PCT Pub. Date: Apr. 28, 2022

(65) Prior Publication Data
US 2023/0382073 A1 Nov. 30, 2023

(30) Foreign Application Priority Data
Oct. 23, 2020 (DE) ................. 10 2020 127 992.2

(51) Int. Cl.
*B30B 15/30* (2006.01)
*B29C 43/34* (2006.01)
*B30B 11/08* (2006.01)

(52) U.S. Cl.
CPC ............ *B30B 15/304* (2013.01); *B29C 43/34* (2013.01); *B30B 11/08* (2013.01)

(58) Field of Classification Search
CPC ..... B30B 11/08; B30B 15/302; B30B 15/304; B30B 15/308; B30B 15/0023; B29B 7/44;
(Continued)

(56) References Cited

U.S. PATENT DOCUMENTS

| 3,322,401 A | 5/1967 | Georges |
| 4,779,970 A | 10/1988 | Irish et al. |

(Continued)

FOREIGN PATENT DOCUMENTS

| CN | 102744904 A | 10/2012 | |
| CN | 202462948 U | * 10/2012 | ............ B30B 11/08 |

(Continued)

OTHER PUBLICATIONS

English translation of CN-104228126-A—10 pages—Retrieved in Jan. 2025. (Year: 2025).*

(Continued)

*Primary Examiner* — Jimmy T Nguyen
(74) *Attorney, Agent, or Firm* — Michael Best & Friedrich LLP

(57) ABSTRACT

A filling unit (10) for a rotary press (12) includes a filling wheel (14), a metering wheel (24), a feeding wheel (30) and a medium unit (36). The filling unit (10) is designed in such a way that the feeding wheel (30) can be connected to and disconnected from a delivery path of the medium to be metered, in particular by having a pivoting device (33) perform a pivoting movement, in particular about an axis of rotation (42) of the metering wheel (24), which is in the form of an impeller (20, 26, 32).

19 Claims, 12 Drawing Sheets

(58) Field of Classification Search
CPC ......... B29B 7/726; B29C 43/02; B29C 43/34; B29C 43/58; B01F 23/60; B01F 27/0723; B01F 27/11253; B01F 27/19; B01F 27/191

See application file for complete search history.

(56) References Cited

U.S. PATENT DOCUMENTS

| | | |
|---|---|---|
| 2010/0015264 A1 | 1/2010 | Kraemer |
| 2017/0170710 A1 | 6/2017 | Song |
| 2017/0282421 A1 | 10/2017 | Kitamura et al. |
| 2017/0355162 A1 | 12/2017 | Oezcoban et al. |
| 2018/0036981 A1 | 2/2018 | Tsukada et al. |
| 2021/0170710 A1 | 6/2021 | Klaer et al. |

FOREIGN PATENT DOCUMENTS

| | | | | |
|---|---|---|---|---|
| CN | 202862643 U | | 4/2013 | |
| CN | 104228126 A | * | 12/2014 | ............. B30B 15/30 |
| CN | 205326356 U | | 6/2016 | |
| CN | 106217935 A | | 12/2016 | |
| CN | 110662647 A | | 1/2020 | |
| CN | 213321941 U | * | 6/2021 | ............. B30B 15/30 |
| DE | 3527186 A1 | | 2/1986 | |
| DE | 202007002707 U1 | | 7/2008 | |
| DE | 102016110556 A1 | | 12/2017 | |
| EP | 1776998 A1 | | 4/2007 | |
| EP | 3222414 A1 | * | 9/2017 | ................ A61J 3/10 |
| EP | 3406436 A1 | | 11/2018 | |
| GB | 2025303 A | | 1/1980 | |
| JP | 46026855 | | 9/1971 | |
| JP | S4626855 Y1 | | 9/1971 | |
| JP | 2009285662 A | | 12/2009 | |
| JP | 2017064786 A | * | 4/2017 | ........... B30B 11/005 |
| JP | 2017177139 A | | 10/2017 | |
| JP | 2020520809 A | | 7/2020 | |
| JP | 2023546480 A | | 11/2023 | |
| KR | 1020150139756 A | | 12/2015 | |
| RU | 2266822 C2 | | 12/2005 | |
| SU | 852636 A1 | | 8/1981 | |
| SU | 1050878 A1 | | 10/1983 | |
| WO | 2015186905 A1 | | 12/2015 | |

OTHER PUBLICATIONS

English translation of CN-213321941-U—3 pages—Retrieved in Jan. 2025 (Year: 2025).*
English translation of JP 2017064786 A—5 pages—Retrieved in Jan. 2025 (Year: 2025).*
International Search Report and Written Opinion for Related Application No. PCT/EP2021/077511 dated Feb. 4, 2022 (13 pages, including an English translation of the ISR).
German Patent Office Action for Related Application No. 102020127992.2 dated Jun. 9, 2021 (11 pages, including an English statement of relevance).
Japanese Patent Office Action for Application No. 2023524690 issued Jul. 4, 2024 (18 pages including English machine translation).
United States Patent Office Action for U.S. Appl. No. 18/249,642 dated Feb. 27, 2025 (10 pages).
Chinese Patent Office Action for Application No. 202180072043.9 dated Jul. 1, 2025 (22 pages including English translation).
United States Patent Office Action for U.S. Appl. No. 18/249,642 dated Jun. 20, 2025 (11 pages).

* cited by examiner

FILLING UNIT FOR A ROTARY PRESS AND A METHOD FOR PROVIDING AN OPTIMIZED ROTARY PRESS

BACKGROUND

The invention relates to a filling unit for a rotary press, and to a method for providing an optimized rotary press.

Rotary presses are used in the pharmaceutical, technical or chemical industry or in the food industry to produce tablets or pellets in large numbers from powdered materials.

Rotary presses have a rotary, driven die plate with die holes arranged therein, which move on a circular path. Lower and upper rams are provided which move with the die plate on a circular path and move up and down during the revolution. The lower and upper rams are designed in such a way that their upper or lower ram ends penetrate into the die holes arranged in the die plate in order to compress into tablets the powder material inserted in the holes.

The powder being pressed is supplied to the die holes via a hopper with a built-in filling unit with rotating impellers. Such filling units are shown, for example, from EP 3 406 436 A1 and DE 20 2007 002 707 U1.

DE 10 2016 110 556 A1 and DE 35 27 186 A1 each disclose filling units.

The flow of powder from the hopper into the die holes is facilitated by means of the impellers, in order to achieve consistent filling and thus a consistent weight of each individual tablet.

Filling units with two impellers are generally used for free-flowing, non-sticky products for pharmaceutical applications. The powder is metered and filled directly from the hopper via the filling wheel and metering wheel into the die holes.

Filling units having three impellers are generally used for materials with poorer flow properties in order to achieve the most uniform flow possible.

Filling units having three impellers contribute to maintaining a consistent pressure on the supply region, which is supported by the presence of a third impeller, the feeding wheel. This is generally arranged above the two other impellers (the filling wheel and metering wheel).

In this type of feed, the powder is filled and metered from the hopper via the feeding wheel, the filling wheel and the metering wheel into the die holes.

Depending on the flow behavior/properties of the powder, the filling unit may be equipped with corresponding impellers in order to obtain an adapted metering behavior—and may therefore be converted manually.

SUMMARY

The object of the present invention is to provide a filling unit for a rotary press and a method for providing an optimized rotary press which eliminate the above disadvantages.

This object is achieved according to the invention by a filling unit for a rotary press. The filling unit according to the invention comprises:
a filling wheel which is designed to fill a medium to be metered, in particular a powder, into die holes of a die plate of the rotary press. The filling wheel is designed as an impeller. The filling wheel has vanes and is designed to deliver the medium to be metered by means of its vanes via a rotating movement. In other words, the vanes of the filling wheel designed as an impeller move on a circular path around the center point of the filling wheel.

The filling unit further comprises a metering wheel which is designed to precisely meter a quantity of medium to be metered into the respective die holes of the die plate. The metering wheel is designed as an impeller. The metering wheel has vanes and is designed to precisely meter the quantity of the medium to be metered by scraping over the die holes of the die plate with its vanes, via a rotating movement. In this case, excess medium is removed by the scraping of the die holes of the die plate. In other words, the vanes of the metering wheel designed as an impeller move on a circular path around the center point of the metering wheel, and scrape over the die holes at the same time.

The filling wheel thus moves the powder into the die holes of the die plate. Typically, the underside of the die hole is closed off by a corresponding lower ram. Before the die hole reaches the metering wheel, the lower ram can be raised slightly to a precisely specified position in order to define a precisely defined size of the die hole. Subsequently, the portion of powder projecting upward from the die hole is "scraped", i.e., removed, by means of the metering wheel.

The filling unit has a feeding wheel which is designed to supply the medium to be metered to the filling wheel. The feeding wheel is designed as an impeller. The feeding wheel has vanes and is designed to deliver the medium to be supplied to the filling wheel by means of its vanes via a rotating movement. In other words, the vanes of the feeding wheel designed as an impeller move on a circular path around the center point of the feeding wheel. In this case, they deliver the medium to be metered to the filling wheel.

The filling unit further comprises at least one medium supply unit which is designed to supply the medium to the filling wheel. Alternatively or additionally, the medium supply unit can supply the medium to the feeding wheel. The medium enters the filling unit via the medium supply unit. The medium supply unit can comprise, for example, a hopper, a tube or a hose.

The filling unit is designed such that the feeding wheel can be connected to or disconnected from a delivery path of the medium to be metered. This can take place in particular by a pivoting movement of the feeding wheel. In particular, the feeding wheel can be pivoted about an axis of rotation of the metering wheel designed as an impeller. For this purpose, a corresponding pivoting device can be provided. The feeding wheel can in particular be bridged or bypassed by means of a second medium supply unit. It is also conceivable that the medium supply unit can be designed so as to be displaceable in such a way that the displacement allows selecting the medium supply unit—whether the delivery path of the medium to be metered passes through the feeding wheel or not.

By connecting or disconnecting the feeding wheel from the delivery path of the medium to be metered, or bypassing the feeding wheel, the filling unit can be adapted to different mediums with different flow characteristics/properties, without the individual impellers having to be replaced.

In the present case, the delivery path of the medium to be metered means the path of the medium through the filling unit into the die holes.

The medium supply unit can comprise a shunt gate. By means of this shunt gate, the medium to be metered can optionally be supplied to the feeding wheel or to the filling wheel. As such, a selection can be made as to whether or not the delivery path of the medium leads via the feeding wheel without the need for removal of the feeding wheel, or without the need for disconnecting/pivoting the feeding wheel from/out of the delivery path.

The vanes of the filling wheel, metering wheel and/or feeding wheel designed as an impeller are designed such that a delivery surface of each vane can be varied in its shape.

The delivery surface of the vanes is formed by the surface of the vanes with which the given impeller delivers the medium. The delivery surface is therefore the part of the vanes which, during operation of the filling unit, is designed and configured to contact the medium and to deliver or meter it via the particular rotational movement The variation of the shape of the delivery surface can be realized by a rotation of the vanes of the filling wheel, metering wheel and/or feeding wheel designed as an impeller about its axis of extension. For this purpose, the vanes of the filling wheel, metering wheel and/or feeding wheel designed as an impeller can be designed to be rotatable about their respective axes of extension. In this case, the vanes can be brought into at least two rotational positions by a rotation about their respective axes of extension, in which rotational positions the vanes form differently shaped delivery surfaces. Depending on the rotational position of the vanes, the medium to be metered can be delivered with differently shaped delivery surfaces.

Due to the rotation of the vanes into different rotational positions, differently shaped delivery surfaces can be realized. The rotation of the vanes can be realized, for example, by a gear mechanism, a sliding mechanism, a crank drive, a cable pull, a piston drive and/or via a cam.

The vanes can have, in particular on a first side, a delivery surface in the form of a circular arc, in particular a semi-circle; in particular on an opposite side, a planar delivery surface can be provided. By simply rotating 180 degrees, the delivery surface can be changed back and forth between the shape of a vane with a circular cross section and a vane with a square cross section, for example.

The vanes can in particular have a triangular cross section. In particular, the cross section of the vanes can correspond to an isosceles triangle, in particular an equilateral triangle. In this case, the vanes can be brought by a rotation into a position in which a corner of the triangular cross section points downwards and thus forms an angular underside of the vanes. A "sharp-edged" underside can thus be realized. The vanes can also be rotated in such a way that a corner of the triangular cross section points upward. In this case, one of the sides of the triangle of the cross section forms the underside of the vanes. It is thus possible to choose between the different undersides of the vanes, and to choose a desired positioning. Of course, the delivery surface of the vanes with a triangular cross section can also be varied by a rotation of the vanes. Here too, it is possible to select between a delivery surface which is designed to be flat and a delivery surface which is angular.

The vanes can in particular have a rectangular, in particular square, cross section. With a rectangular cross section, two opposite sides can be shorter and the two other opposite sides can be designed to be longer. The two longer faces of the rectangular cross section form a greater lateral surface of the vanes than the two shorter faces of the rectangular cross section. As such, a rotation of the vanes makes it possible to select between a delivery surface with a greater surface area and a delivery surface with a smaller surface area.

The shape of the delivery surface can be modified by a variable inclination of the vanes with respect to a radial direction extending from the axis of rotation of the given impeller.

In other words, the vanes of the filling wheel, metering wheel and/or feeding wheel designed as an impeller can be designed such that an angle, which is defined by the respective axes of extension of the vanes (and/or their longitudinal extension) and a radial direction of the respective impellers extending from the axis of rotation, can be varied. The inclination of the vanes can also be realized by means of a gear mechanism. A type of "cable pull solution" for changing the inclination of the vanes is also conceivable.

The shape of the delivery surface can be modified by a variable curvature of the vanes of the filling wheel, metering wheel and/or feeding wheel designed as an impeller. A curvature in the sense of this application means an at least sectionally, in particular arcuate, deviation from a straight course. In particular, the curvature can be a particularly arcuate deviation, at least in sections, from the radial direction extending from the axis of rotation of the respective impellers. The vanes can have at least one section with a variable curvature.

A variable curvature of the vanes can be realized, for example, by a bimetal, a cable pull and/or a traction or pressure element. It is also conceivable that the variable curvature can be implemented only along a section or a plurality of sections of the vanes. In particular, the variable curvature can be realized along the entire length of the vanes.

By changing the shape of the delivery surface of the vanes, the filling wheel, metering wheel and/or feeding wheel designed as an impeller can be adapted to different mediums having different flow characteristics/properties, without the individual impellers having to be replaced. As such, removal of the respective impellers is unnecessary. The shape of the delivery surface of the vanes can be varied/modified in the assembled state of each impeller without the respective impellers having to be removed for this purpose.

It is thus conceivable that the shape of the delivery surface of the vanes can be varied/adjusted during operation of the rotary press.

It is conceivable that the shape of the delivery surfaces during the production process of the tablets, and/or while the respective impellers are delivering the medium to be metered through the filling unit, can be varied. However, it can also be provided that the production process of the tablets and/or the delivery of the medium to be metered through the filling unit is briefly paused, then the shape of the delivery surfaces is changed, and the production process of the tablets and/or the delivery of the medium to be metered through the filling unit is subsequently resumed. In both cases, removal of the respective impellers and/or the filling unit is not necessary.

The vanes of the filling wheel, metering wheel and/or feeding wheel designed as an impeller can be designed such that they are displaceable parallel to the axis of rotation of the impeller. In other words, the vanes are designed to be height-adjustable. As such, for example, when the vanes, the cross section of which deviates from a circular shape, are rotated about their respective axes of extension, the lower edge of the vanes can be held at a constant height or at a constant level. It can thus be ensured that no gaps arise between the impeller and the element of the filling unit arranged underneath. In other words, the height adjustment of the vanes ensures that while the medium is delivered by means of the given impeller, the entire medium to be delivered is captured and delivered by the vanes.

The vanes of the filling wheel, metering wheel and/or feeding wheel designed as an impeller can have a triangular, a rectangular, in particular square, or an at least partially rounded cross section. Of course, cross sections with other geometric shapes are also conceivable.

The vanes of the filling wheel, metering wheel and/or feeding wheel designed as an impeller can have a consistent cross section along a region of their respective axes of extension. In particular, the cross section along the entire axis of extension can be the same. However, it is also conceivable for the surface area of the cross section to become larger or smaller along the respective axes of extension in the radial direction from the respective axis of rotation, and/or to change along the axis of extension, in particular uniformly.

The number of vanes per impeller of the filling wheel, metering wheel and/or feeding wheel designed as an impeller can vary, and can be even and/or odd.

The vanes of the filling wheel, metering wheel and/or feeding wheel designed as an impeller can be designed to be exchangeable. In particular, the vanes can be designed as an exchangeable element of the individual impellers. As such, the vanes can be exchanged quickly and easily for other vanes, in particular for vanes having a different cross section. As such, for example, when a vane is damaged, the corresponding vane can be replaced without the entire impeller having to be replaced. Moreover, the exchangeability expands the number of different shapes of the delivery surface.

Each of the filling wheels, metering wheels and/or feeding wheels designed as an impeller can have vanes which have a different cross section along their respective axes of extension. In other words, each filling wheel, metering wheel and/or feeding wheel can have differently shaped vanes. For example, the filling wheel can have vanes having a triangular cross section, the metering wheel can have vanes with a round cross section, and the feeding wheel can have vanes with a square cross section.

The vanes of the filling wheel, metering wheel and/or feeding wheel designed as an impeller can be arranged such that an extension of the respective axes of extension runs at a distance from an axis of rotation of the respective impellers. The extension of the respective axes of extension thus forms a tangent to a circle about the axis of rotation, wherein the circle has a radius different from zero. In other words, the vanes are arranged inclined with respect to a radial direction extending from the center point of the respective impellers. In other words, the extension of the respective axes of extension and the radial direction originating from the center point of the given impeller together form an angle which is different from zero, in particular between zero and 90 degrees, in particular between zero and 45 degrees, in particular between 0 and 20 degrees.

The filling unit can be designed in such a way that the direction of rotation and/or the rotational speed of the filling wheel, metering wheel and/or feeding wheel designed as an impeller can be varied. The direction of rotation and/or the rotational speed can be preset before the production of the tablet as a function of the particular medium (or powder). However, it is also conceivable for the direction of rotation and/or the rotational speed to be varied during the production of the tablet, that is to say during the delivery of the medium (or during the rotation of the respective impellers). In particular, the direction of rotation can be varied independently of the rotational speed.

The filling unit can have at least one electric motor. In this case, the electric motor can drive the filling wheel, metering wheel or feeding wheel designed as an impeller, directly or indirectly, for example via at least one gearwheel and/or one toothed belt. It is also conceivable for a plurality of impellers to be driven by the electric motor. However, it is also conceivable for each impeller to be driven by a separate electric motor.

Alternatively or additionally, the electric motor can vary directly or indirectly, for example via at least one gearwheel and/or one toothed belt, the rotational position of the vanes and/or the inclination or the angle which is defined by the respective axes of extension of the vanes and a radial direction of the respective impellers extending from the axis of rotation. It is conceivable that the rotational position of the vanes and the inclination of the vanes with respect to a radial direction extending from the axis of rotation of the respective impellers are varied by means of the same electric motor. However, it is also conceivable for a separate electric motor to be provided in each case for varying the rotational position and the inclination of the vanes.

In particular, a plurality of electric motors can form an electric motor group and can be designed as an exchangeable element. As such, a plurality of electric motors can be quickly and easily replaced as one element with another electric motor group (e.g., in case of damage). It is also conceivable that the gearwheels which transmit a torque from the electric motors to the impellers can be designed as a gear group, wherein these can likewise be designed as an exchangeable element.

In particular, the electric motor can be designed in the form of a servomotor or a compressed air motor. In particular, all electric motors can be designed in the form of servomotors or compressed air motors. It is also conceivable that, alternatively or in addition to the electric motor, a pneumatic and/or hydraulic drive can be provided. Other types of drive and a manual drive ("by hand") are also conceivable.

The above object is also achieved by the method according to the invention for providing an optimized rotary press having the features of the independent claim. The method according to the invention comprises the steps of:

Providing a first rotary press having an adjustable filling unit. The adjustable filling unit in this case has at least one element with at least one adjustable configuration parameter. A configuration parameters in the sense of this application is a value which influences the delivery of the medium within the filling unit (or rotary press) and/or properties of the tablets produced (e.g., tablet quality).

Producing a plurality of tablets with the first rotary press with different settings of the configuration parameter in each case. For example, batches of tablets can be produced, wherein each batch can be produced with a different setting of the configuration parameter.

As such, different settings for a configuration parameter can be tested by means of the first rotary press having the adjustable filling unit in order to find the optimum settings. A change and/or replacement of the corresponding elements relating to the configuration parameters is not necessary.

Analyzing the produced tablets with respect to desired properties to identify a tablet (or batch of tablets) among the tablets produced which has/have preferred properties. These can in particular be quality features of the tablet (e.g., particularly good solidity, weight, breaking strength, center height).

Identifying the setting of the configuration parameter for which the tablet (or batch) having preferred properties was produced.

Providing at least one second rotary press having an optimized filling unit. The optimized filling unit has at least one element with a fixed, prespecified configuration parameter for which the tablet (or tablet batch) having preferred properties was produced.

In other words, once the optimal configuration parameter is identified by means of the first rotary press having the adjustable filling unit, this configuration parameter is transferred to a second rotary press. This configuration parameter is then no longer adjustable on the second rotary press. It is also conceivable for the first rotary press to be configured with such an optimized filling unit. In other words, the first rotary press having an adjustable filling unit can be converted to a rotary press having an optimized filling unit.

Because the elements of the second rotary press already have the optimal configuration parameters and no longer have to be set, these elements can be designed more easily. Additional elements/parts required for the adjustability can be omitted. As a result, the corresponding elements are more favorable to produce. The second rotary press can thus be designed more cost-effectively—and smaller. In addition, the elements of the second rotary press can be designed to be more robust and durable.

In the production of the tablets by means of a rotary press, a certain start-up time is necessary. For example, it takes some time until the medium to be metered has uniformly distributed over the entire delivery path. This means that the first tablets of a batch can have properties deviating from the other tablets of the same batch.

It is therefore conceivable for the first tablets of a batch not to be taken into account in the analysis of the tablets produced for identifying the optimal configuration parameter. However, it is also conceivable that the batch has such a large number of tablets that the deviation of the tablet properties between the first tablets and the remaining tablets of a batch is negligible due to the high number of tablets in the batch.

The adjustable filling unit of the first rotary press is a filling unit according to the above embodiments.

The adjustable configuration parameter can be the direction of rotation or the rotational speed of the filling wheel, metering wheel, or feeding wheel designed as an impeller.

It is also conceivable that the adjustable configuration parameter can be speed, primary pressure, main pressure, weight metering, immersion depth, and/or position of the blank in the die.

The connection or disconnection of the feeding wheel into the delivery path or out of the delivery path of the medium to be metered can also constitute a configuration parameter. In other words, a configuration parameter can represent the arrangement of the feeding wheel in or out of the delivery path of the medium to be metered.

The adjustable configuration parameter can be the shape of the delivery surfaces of the vanes or the inclination of the vanes. In this case, the shape of the delivery surfaces of the vanes can be changed by a rotation of the vanes about their respective axes of extension. The inclination of the vanes means the angle that is defined by the respective axes of extension (or the extension thereof) of the vanes and a radial direction of the respective impeller extending from the axis of rotation.

In the step of producing tablets with the first rotary press, multiple configuration parameters can be changed simultaneously. It is conceivable that the plurality of configuration parameters can be set for the same element. However, it is also conceivable that the plurality of configuration parameters can be set on a plurality of elements, wherein in particular a configuration parameter can be set for one element.

BRIEF DESCRIPTION OF THE DRAWINGS

Further features, details and advantages of the invention emerge from the wording of the claims and from the following description of exemplary embodiments with reference to the drawings. In the drawings:

DETAILED DESCRIPTION

In the following description and in the figures, corresponding components and elements bear the same reference signs. For improved clarity, not all reference signs are reproduced in all figures.

Figure 1:
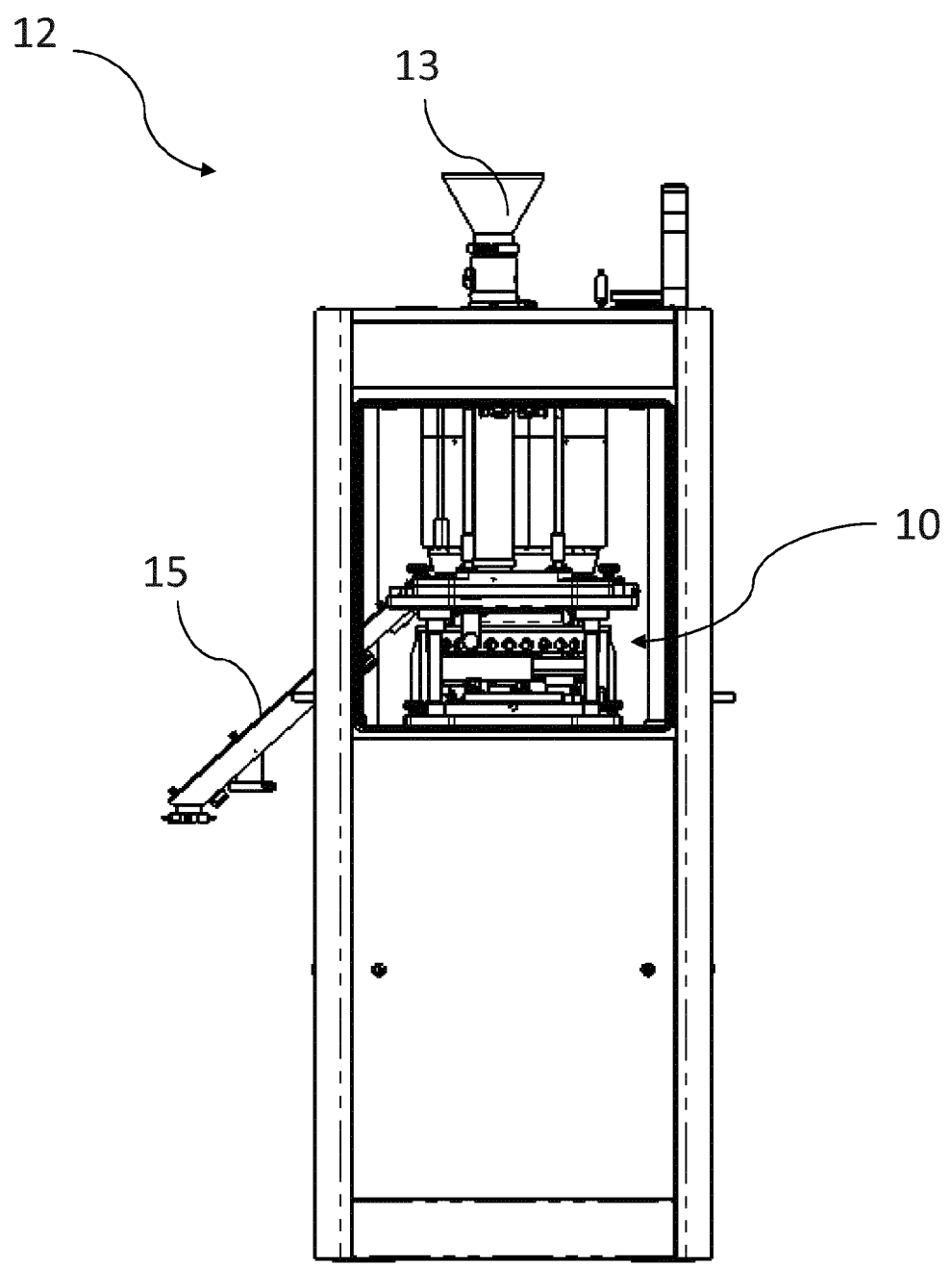
FIG. 1 is a side view of a rotary press having a filling unit.

FIG. 1 shows a side view of a rotary press 12 having a filling unit 10. In the present case, the medium to be metered, i.e., the powder to be pressed into the tablets, reaches the rotary press 12 via a hopper 13. After the tablets are pressed, they are delivered out of the rotary press 12 via the discharge chute 15.

Figure 2:
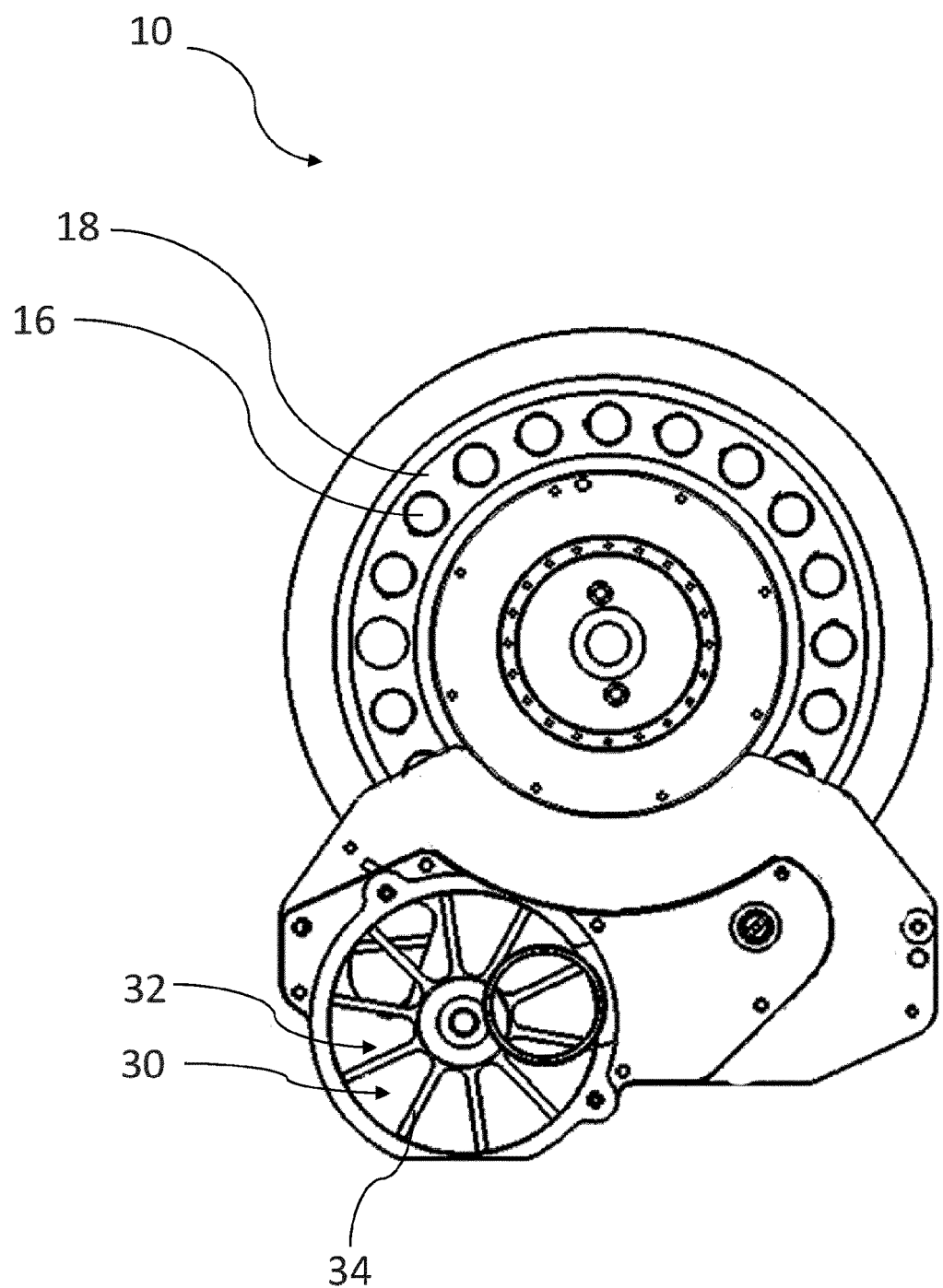
FIG. 2 is a plan view of the filling unit with a die plate according to FIG. 1.

FIG. 2 shows a plan view of the filling unit 10 with a die plate 18 according to FIG. 1. The die plate 18 has a plurality of die holes 16 arranged on a circular path into which the medium to be compressed to form the tablets is metered by means of the filling unit 10.

Figure 3:
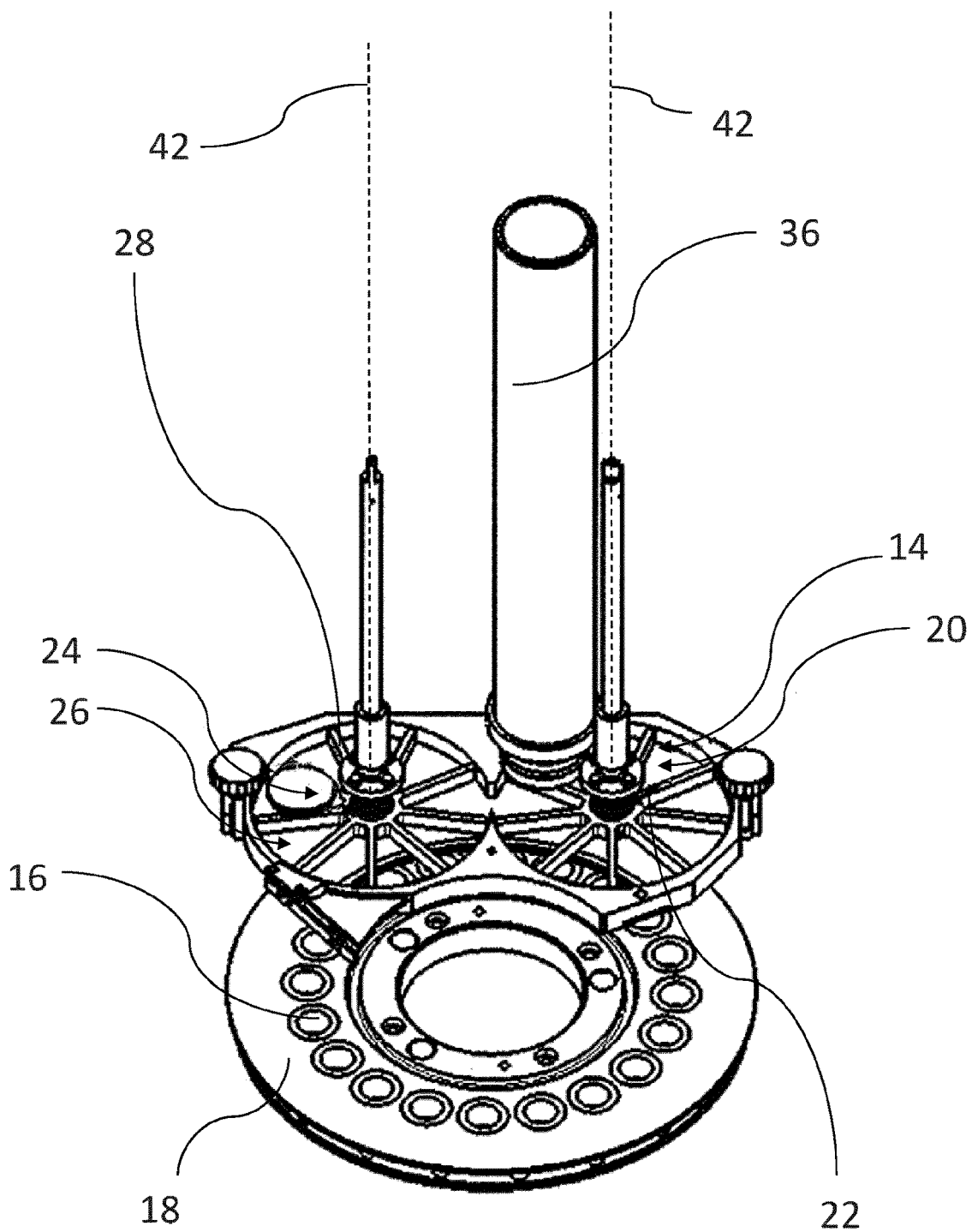
FIG. 3 is a perspective view of a further exemplary embodiment of the filling unit.

FIG. 3 is a perspective view of a further exemplary embodiment of the filling unit 10. The medium to be metered is fed via the medium supply unit 36 to a filling wheel 14. In the present case, the medium supply unit 36 is designed as a straight pipe.

For the sake of clarity, a feeding wheel 30 that can be connected into the delivery path is not shown in FIG. 3. The delivery path shown corresponds to a delivery path in which the feeding wheel is disconnected from the delivery path.

The filling wheel 14 is designed as an impeller 20 with vanes 22. The filling wheel 14 delivers the medium to be metered into the die holes 16 of the die plate 18. This is done by rotating the filling wheel 14 about its axis of rotation 42 (indicated by a dashed line).

The quantity of the medium to be metered in the die holes 16 of the die plate 18 is precisely metered by means of a metering wheel 24. The metering wheel is designed as an impeller 26 with vanes 28. This is done by rotating the metering wheel 24 about its axis of rotation 42 (indicated by a dashed line). In this case, the die holes 16 are scraped by the vanes 28 of the metering wheel 24 so that excess medium is removed and a precisely defined quantity of medium remains in the die holes 16.

The amount of medium remaining in a die hole 16 is subsequently pressed into a tablet. This can be realized, for example, by means of a lower and/or upper ram which are moved relative to one another (not shown).

Figure 4:
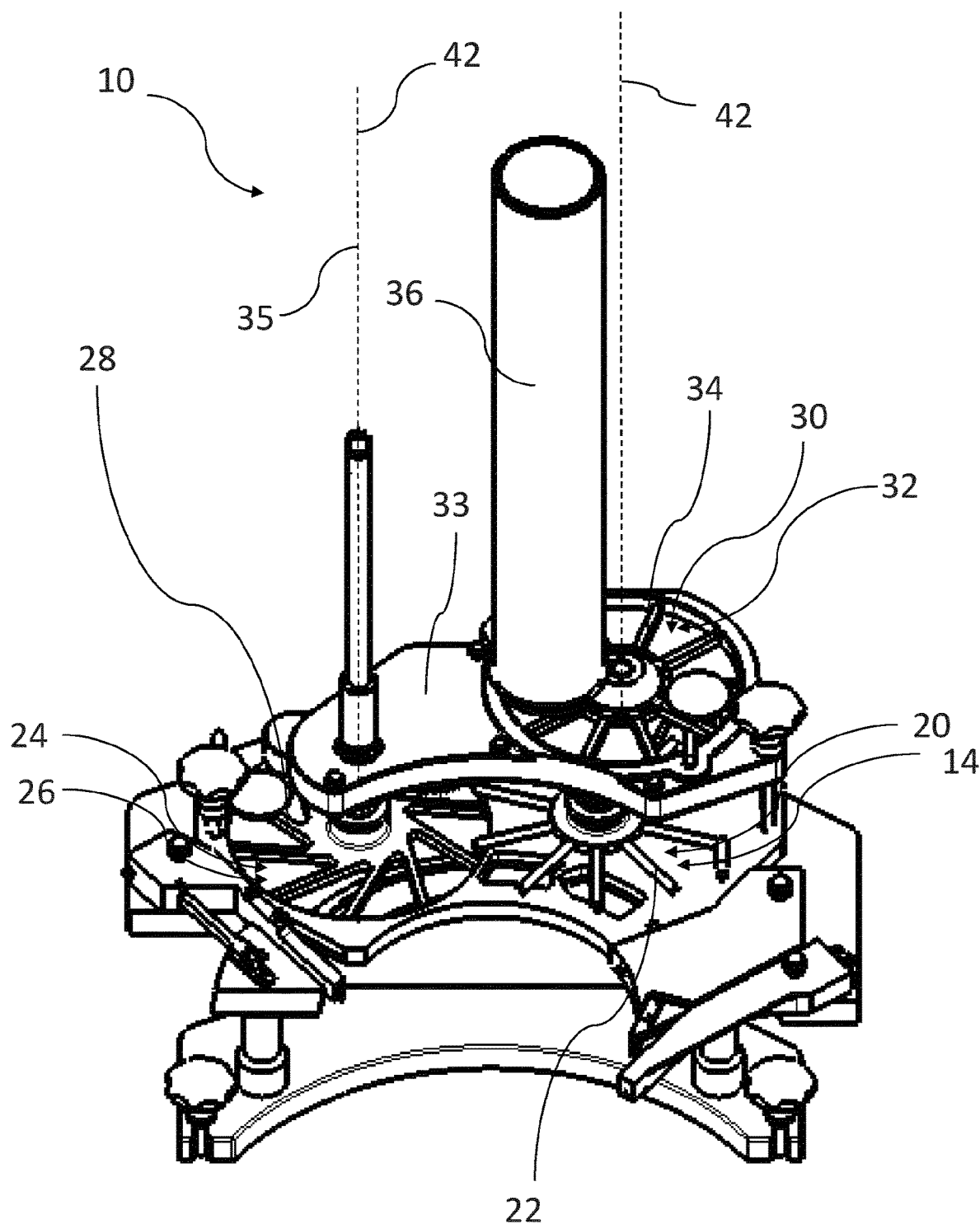
FIG. 4 is a perspective view of a further exemplary embodiment of the filling unit.

FIG. 4 is a perspective view of a further exemplary embodiment of the filling unit Analogously to the exemplary embodiment shown in FIG. 3, the filling unit 10 shown has a filling wheel 14 and a metering wheel 24. In the present case, the die plate 18 with the die holes 16 is not shown. In the present case, the feeding wheel 30 of the filling unit 10 is shown. It is arranged in the delivery path between the medium supply unit 36 and the filling wheel 14.

The medium supply unit 36 supplies the medium to be metered to the feeding wheel 30. The feeding wheel 30 is designed as an impeller 32 with vanes 34. The medium to be metered is fed to a filling wheel 14 by means of the feeding wheel 30. This is done by a rotation of the feeding wheel 30 about its axis of rotation 42 (indicated by a dashed line).

In the present case, the feeding wheel 30 is arranged on a pivoting device 33. The pivoting device 33 and thus also the feeding wheel 30 can be pivoted about the pivot axis 35. In the present case, the pivot axis 35 and the axis of rotation 42 of the metering wheel 24 are identical. As such, the feeding wheel 30 can be pivoted out of the delivery path of the medium or can be pivoted into the delivery path of the medium.

The illustrated delivery path of the medium runs via the medium supply unit 36, which feeds the medium to the feeding wheel 30. This delivers the medium via a rotation about its axis of rotation 42 to the filling wheel 14. The filling wheel 14 fills the die holes 16 (not shown) by means of a rotation about its axis of rotation 42 (not shown). Subsequently, the medium introduced into the die holes 16 is precisely metered in by the vanes 28 of the metering wheel 24 scraping over the top. This is also brought about by a rotation of the metering wheel 24 about its axis of rotation 42.

If the feeding wheel 30 is pivoted out of the delivery path about the pivot axis 35, the delivery path of the medium then runs via the medium supply unit 36, which supplies the medium directly to the filling wheel 14. Subsequently, the medium is filled by the filling wheel into the die holes and then precisely metered by the metering wheel 24 (see above).

Alternatively or in addition to the pivoting device 33, the medium supply unit 36 can have a shunt gate (not shown) which selectively supplies the medium either directly to the feeding wheel 30 or to the filling wheel 14. As such, it is possible to select between a delivery path with the feeding wheel 30 and a delivery path without the feeding wheel 30, without the feeding wheel 30 being pivoted out of the delivery path for this purpose.

Figure 5:
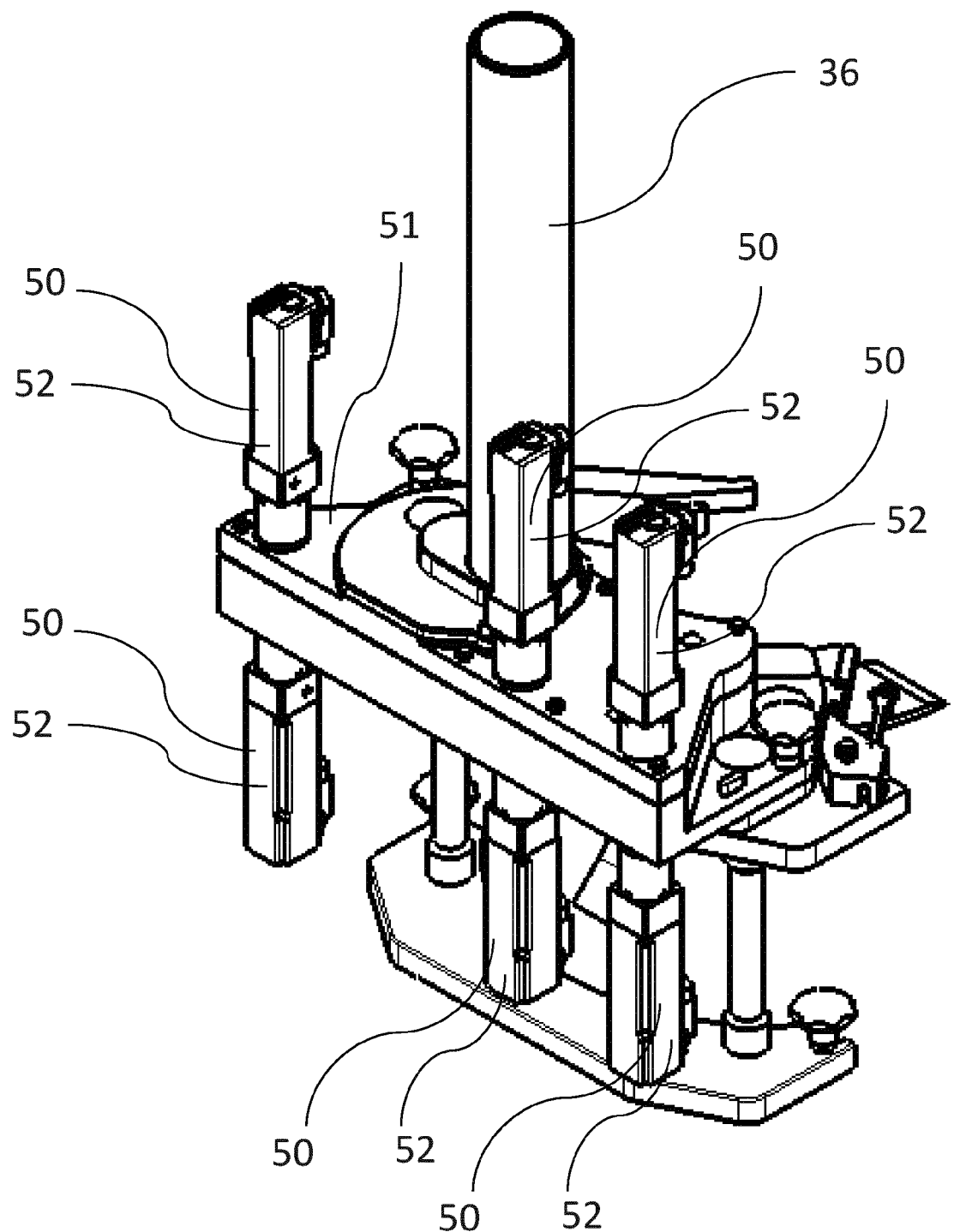
FIG. 5 is a perspective view of a further exemplary embodiment of the filling unit.

FIG. 5 is a perspective view of a further exemplary embodiment of the filling unit 10. In the present case, the filling wheel 14, the feeding wheel 30 and the metering wheel 24, which are concealed by a cover 51, are not shown.

In the present case, six electric motors 50, which are designed in the form of servomotors 52, are shown. In this case, pairs of servomotors 52 are arranged opposite each other. Each servomotor 52 can be controlled or operated individually and independently of the remaining servomotors 52. The servomotors 52 can be designed as a servomotor group which is designed as an exchangeable element. As such, for example, the three upper servomotors 52 in FIG. 5 can form an exchangeable element and the three lower servomotors 52 in FIG. 5 can form a further exchangeable element. For example, in the case of a defect, the servomotors 52 can be replaced quickly and easily.

Figure 6:
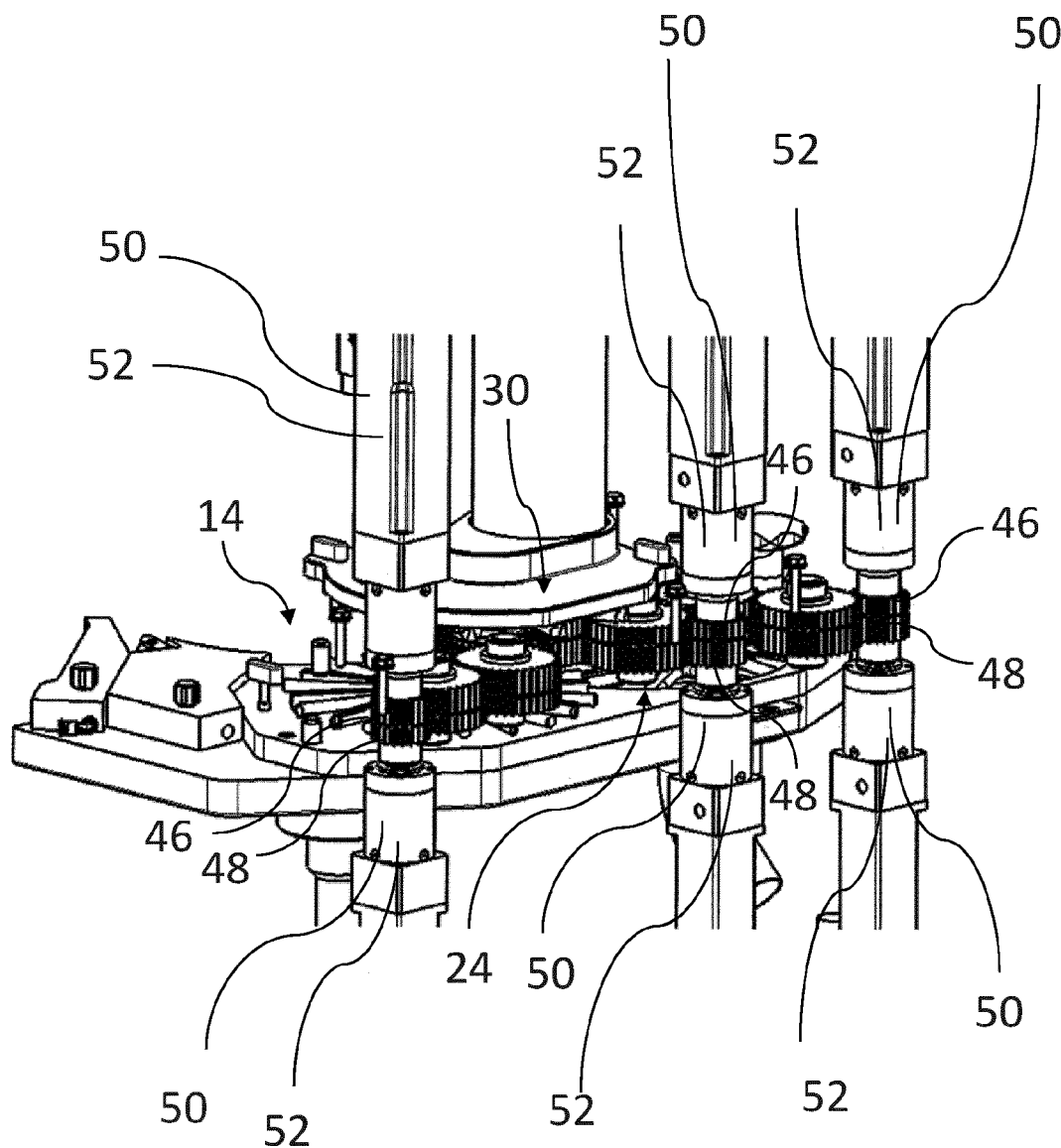
FIG. 6 is a detail of a perspective view of the filling unit according to FIG. 5 from another perspective.

FIG. 6 shows a detail of a perspective view of the filling unit 10 according to FIG. 5 from another perspective. In the present case, the cover 51 is not shown, so that the filling wheel 14, the feeding wheel 30, and the metering wheel 24 which are concealed in FIG. 5 can be seen.

The filling wheel 14, the feeding wheel 30 and the metering wheel 24 are coupled to the servomotors 52 by means of gearwheels 46, 48. A torque can be transmitted by the respective servomotor 52 to the filling wheel 14, feeding wheel 30 or metering wheel 24 by the gearwheels 46, 48. The transmitted torque can then be used for rotating the filling wheel 14, the feeding wheel 30 and/or the metering wheel 24 designed as an impeller 20, 26, 32 and/or can be used to adjust the rotational position, the inclination and/or the curvature of the vanes 22, 28, 34 of the corresponding impeller 20, 26, 32.

Figure 7:
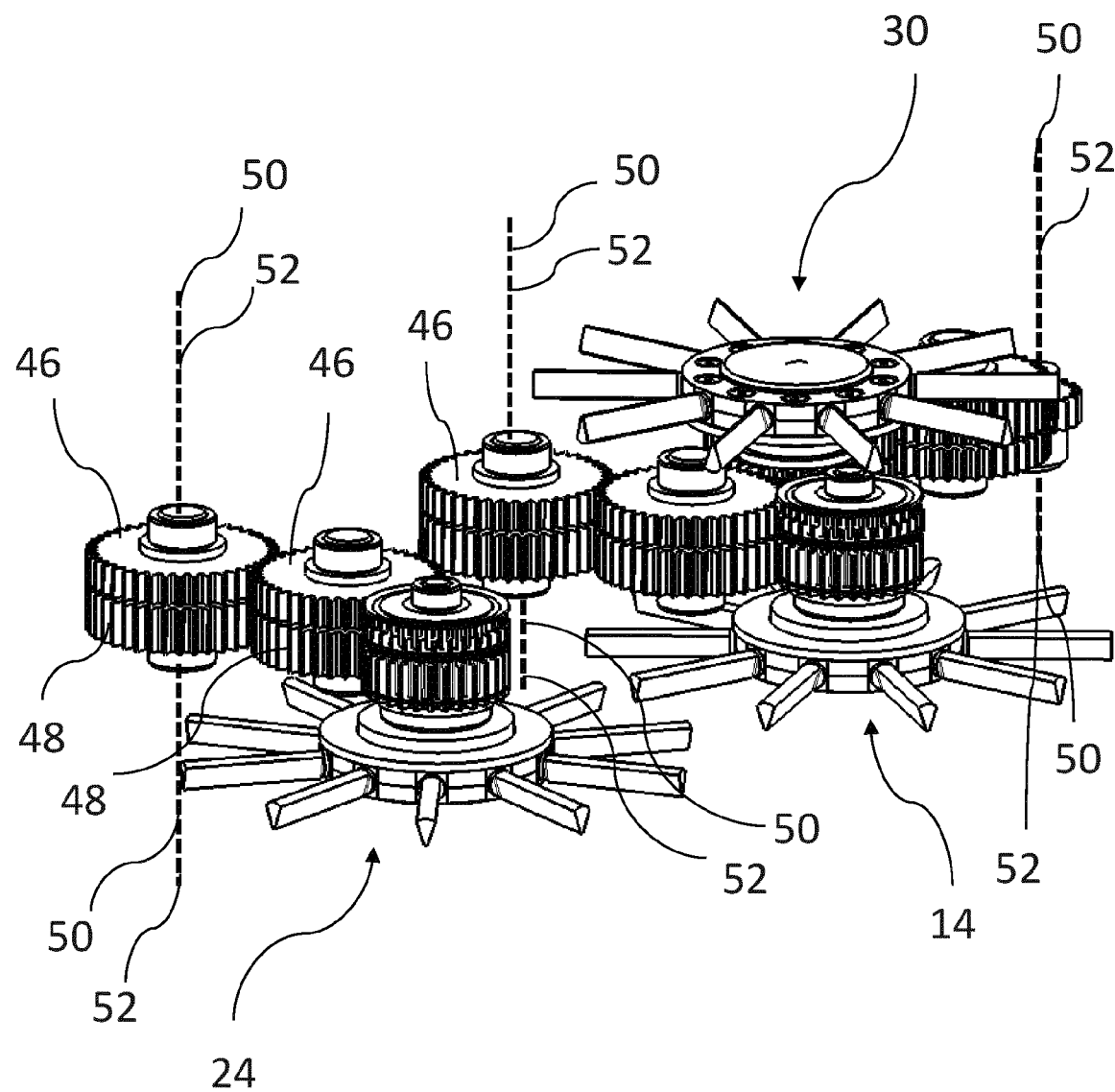
FIG. 7 is a perspective view of a filling wheel, metering wheel and feeding wheel designed as an impeller, in addition to the gearwheels.

FIG. 7 shows a perspective view of a filling wheel 14, metering wheel 24 and feeding wheel 30 together with gearwheels 46, 48. Six servomotors 52 are indicated by means of dashed lines. In the present case, the torque of three servomotors 52 arranged at the top in FIG. 7 is transmitted to a first gearwheel 46 in each case. This first gearwheel meshes with a second gearwheel 46 and the second gearwheel 46 meshes with a third gearwheel 46, which is arranged on the filling wheel 14, metering wheel 24 or feeding wheel 30. Accordingly, the torque is transmitted from the three remaining servomotors 52 (in FIG. 7, the servomotors 52 arranged at the bottom) to a first gearwheel 48 in each case. This first gearwheel meshes with a second gearwheel 48, and the second gearwheel 48 meshes with a third gearwheel 48, which is arranged on the filling wheel 14, metering wheel 24 or feeding wheel 30. As such, the torque of the respective servomotors 52 is transmitted to the filling wheel 14, the metering wheel 24 or the feeding wheel 30.

Figure 8:
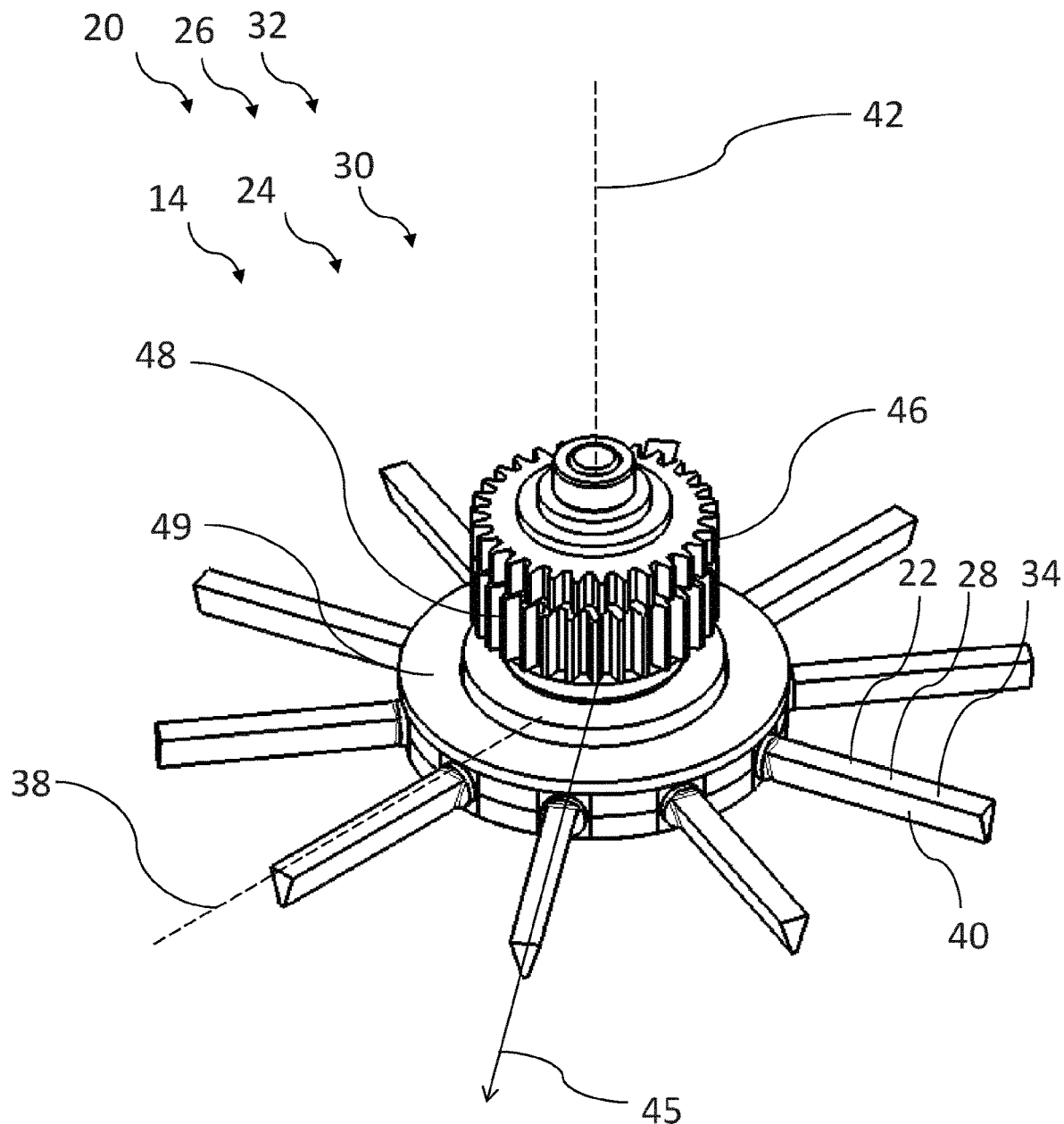
FIG. 8 is a perspective view of an impeller according to FIG. 7.

FIG. 8 shows a perspective view of an impeller 20, 26, 32 according to FIG. 7. The illustrated impeller 20, 26, 32 can be a filling wheel 14, feeding wheel 30 or metering wheel 24.

The impeller 20, 26, 32 has an axis of rotation 42 about which the filling wheel 20, 26, 32 is rotatable. The impeller 20, 26, 32 has ten vanes 22, 28, 34. In the present case, the vanes 22, 28, 34 extend along a radial direction 45 which extends radially outward from the axis of rotation 42 and perpendicular to the axis of rotation 42. The vanes 22, 28, 34 have an axis of extension 38 which corresponds to the longitudinal axis of the vanes 22, 28, 34.

In the present case, the vanes 22, 28, 34 have a triangular cross section, wherein, in the illustrated position, one corner of the triangle constitutes the lower edge of the respective vane 22, 28, 34.

The impeller 20, 26, 32 has an upper gearwheel 46 and a lower gearwheel 48, wherein the impeller 20, 26, 32 and the two gearwheels 46, 48 each have the same axis of rotation 42, that is to say are arranged coaxially with one another. The impeller 20, 26, 32 is designed to be rotatable via the lower gearwheel 48. This can be realized, for example, by the lower gearwheel 48 and the impeller 20, 26, 32 being coupled to one another in a rotationally fixed manner.

If the impeller 20, 26, 32 is rotated, it rotates about the axis of rotation 42 and delivers the medium located between the individual vanes 22, 28, 34 with a respective delivery surface 40.

The vanes 22, 28, 34 can be rotated about their respective axes of extension 38 via the upper gearwheel 46. It is also conceivable that the height (displacement parallel to the axis of rotation 42), the inclination and/or the curvature of the vanes 22, 28, 34 can be changed via the gearwheel 46. The elements required for this purpose, for example in the form of a corresponding mechanism and/or electrical system, can be arranged in a body 49 of the impeller 20, 26, 32.

The lower gearwheel 48 is arranged between the upper gearwheel 46 and the impeller 20, 26, 32. Of course, it is conceivable that the upper gearwheel 46 is arranged between the lower gearwheel 48 and the impeller 20, 26, 32 or that the functions of the upper and lower gearwheels 46, 48 are reversed.

Figure 9:
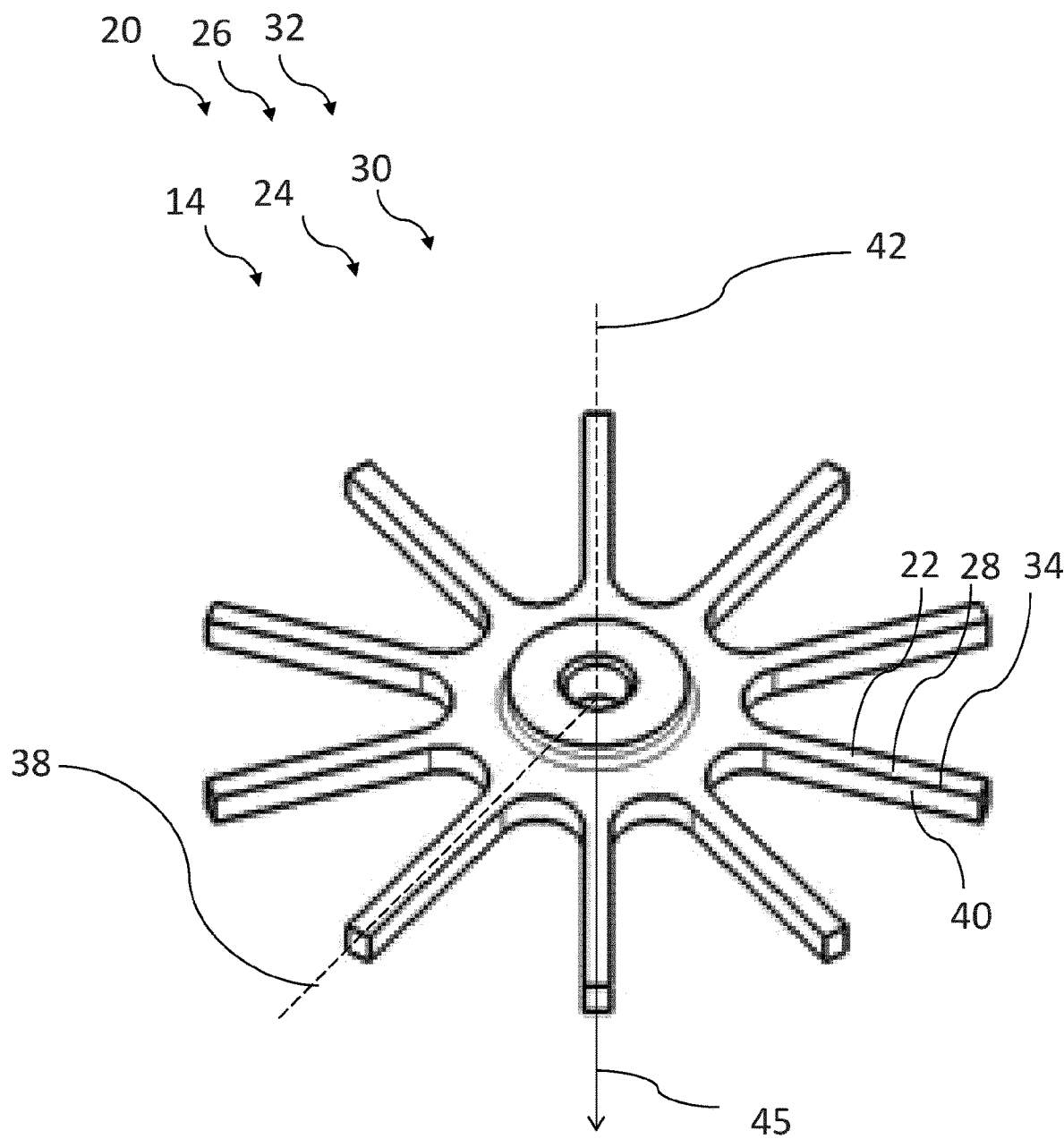
FIG. 9 is a perspective view of a further exemplary embodiment of the impeller.

FIG. 9 is a perspective view of a further exemplary embodiment of the impeller 26, 32. In the present case, the impeller 20, 26, 32 has straight vanes 22, 28, 34 with a rectangular (square) cross section.

Figure 10:
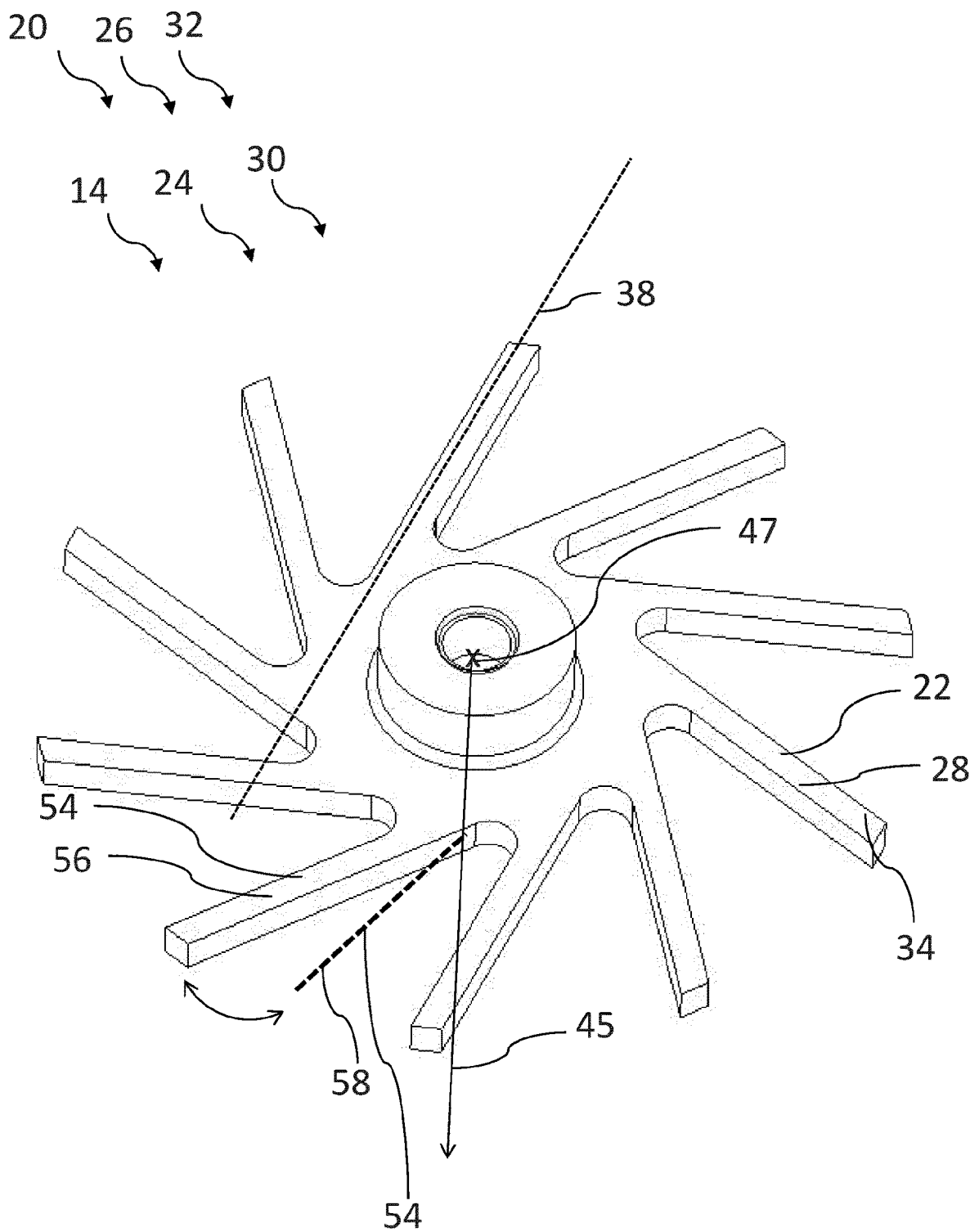
FIG. 10 is a perspective view of a further exemplary embodiment of the impeller.

FIG. 10 is a perspective view of a further exemplary embodiment of the impeller 26, 32. In the present case, an impeller 20, 26, 32 with inclined vanes 22, 28, 34 is shown. The extension of the respective axes of extension 38 of the vanes 22, 28, 34 (indicated by dashed lines) does not intersect the center point of the impeller 20, 26, 32 marked as "x" and designated with the reference numeral 47. The respective axes of extension 38 and/or their extensions are therefore arranged at a distance from the center point 47.

In the case of an impeller 20, 26, 32 with a variable inclination, the vanes 22, 28, 34 can be adjusted such that the angle between the axis of extension 38 (or the extension thereof) of the respective vanes 22, 28, 34 and the radial direction 45 can be varied. For example, a vane 54 can be brought from its illustrated first arrangement 56 into a second arrangement 58 indicated by a dashed line. As can be clearly seen, the angle between the vane 54 in the first arrangement 56 and the radial direction 45 is different (and greater) than that between the vane 54 in the second arrangement 58 and the radial direction 45. The variation of the inclination is indicated here by a double arrow.

Figure 11:
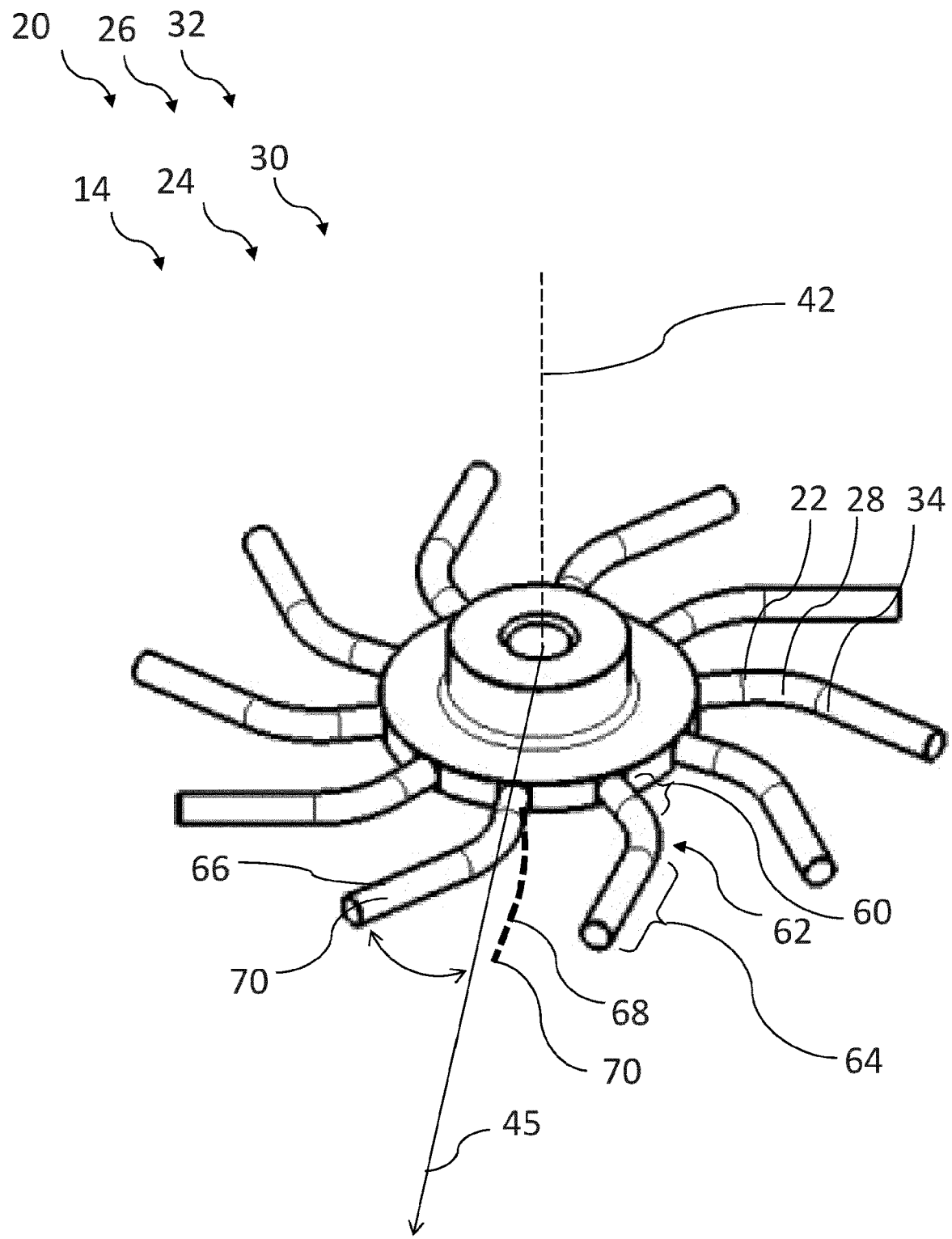
FIG. 11 is a perspective view of a further exemplary embodiment of the impeller.

FIG. 11 is a perspective view of a further exemplary embodiment of the impeller 26, 32. The present exemplary embodiment of the impeller 20, 26, 32 has vanes 22, 28, 34 with a curvature. The vanes 22, 28, 34 each have a first section 60 in which the vanes 22, 28, 34 extend along the radial direction 45 (i.e., straight radially outwards). The first section 60 is adjoined by a second section 62 which is curved with respect to the radial direction 45. The second section 62 is adjoined by a third section 64, which in turn (analogously to the first section is straight.

A possible variable curvature of the vanes 22, 28, 34 of the impeller 20, 26, 32 is indicated (analogous to FIG. 10) by a double arrow and a first arrangement 66 and a second arrangement 68 (indicated by dashed lines) of the vane 70. In the present case, the outer diameter of the impeller 20, 26, 32 is also changed by varying the curvature. A stronger curvature of the vanes 22, 28, 34 with respect to the radial direction 45 results in a smaller outer diameter of the impeller 20, 26, 32. A smaller (lesser) curvature of the vanes 22, 28, 34 with respect to the radial direction 45 results in a greater outer diameter of the impeller 20, 26, 32.

Figure 12:
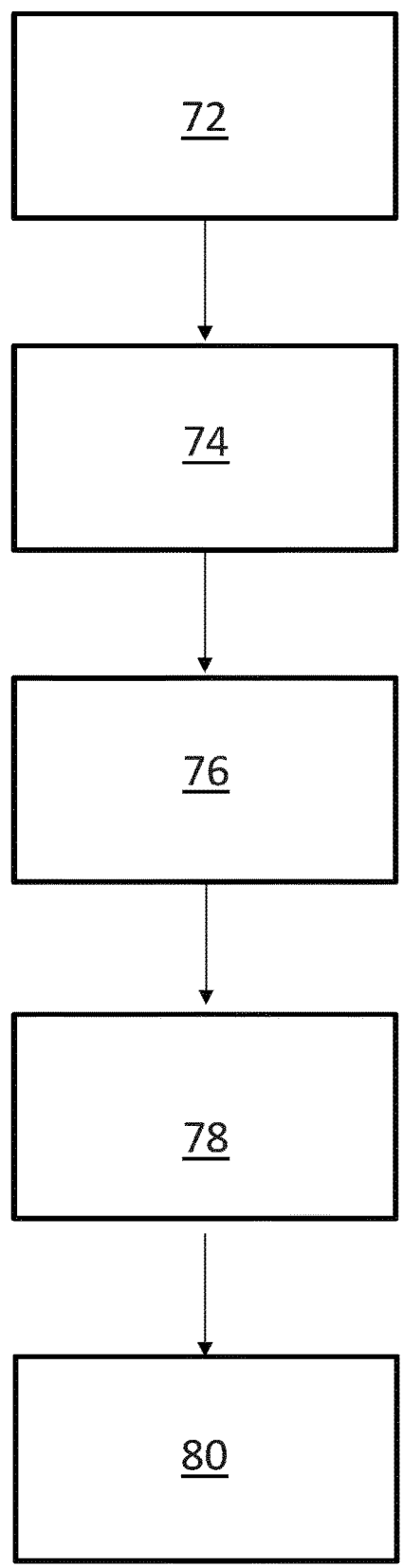
FIG. 12 is a flow chart of a method for providing an optimized rotary press.

FIG. 12 shows a flow chart of a method for providing an optimized rotary press.

The method step of providing a first rotary press 12 having an adjustable filling unit wherein the adjustable filling unit 10 has at least one element with at least one adjustable configuration parameter, is denoted by reference numeral 72.

The subsequent method step of producing a plurality of tablets with the first rotary press 12 with different settings of the configuration parameter is denoted by reference numeral 74.

This method step 74 can be performed as many times as desired with any number of different configuration parameters.

After the tablets have been produced, the next method step is that of analyzing the tablets produced for desired properties, in particular quality features, in order to identify a tablet with preferred properties among the tablets produced. This method step is denoted by reference numeral 76 in FIG. 12.

The method step of identifying the setting of the configuration parameter with which the tablet has been produced with preferred properties is denoted by reference numeral 78.

The final method step of providing at least one second rotary press having an optimized filling unit, wherein the optimized filling unit has at least one element with a fixed, prespecified configuration parameter with which the tablet has been produced with preferred properties, is denoted by reference numeral 80. It is also conceivable that, alternatively or additionally to providing a second rotary press, the first rotary press can be converted into a rotary press having an optimized filling unit.

The flow chart shown in FIG. 12 is used to illustrate in particular the chronological sequence of the individual method steps 72, 74, 76, 78 and 80 alongside each other. In this case, the method steps 72, 74, 76, 78 and 80 are carried out one after the other in the sequence shown in the flow chart.

However, it is also conceivable for one method step to be repeated as often as desired before a next method step is carried out.

What is claimed is:

1. A filling unit (10) for a rotary press (12), the filling unit (10) comprising:
   a filling wheel (14) configured to fill a medium to be metered into die holes (16) of a die plate (18) of the rotary press (12);
   wherein the filling wheel (14) is configured as an impeller (20) and is configured to deliver the medium to be metered via a rotating movement by its vanes (22);
   a metering wheel (24) configured to meter a quantity of medium to be metered into the respective die holes (16) of the die plate (18), wherein the metering wheel (24) is configured as an impeller (26) and is configured to meter the quantity of the medium to be metered and to remove excess medium by scraping over the die holes (16) of the die plate (18) with its vanes (28) via a rotating movement;
   a feeding wheel (30) configured to feed the medium to be metered to the filling wheel (14),
   wherein the feeding wheel (30) is configured as an impeller (32) and is configured to deliver the medium to be supplied to the filling wheel (14) via a rotating movement by its vanes (34);
   at least one medium supply unit (36) which is designed to supply the medium to the filling wheel (14) and/or the feeding wheel (30), wherein the vanes (22, 28, 34) of the filling wheel (14), the metering wheel (24) and/or the feeding wheel (30) each have a delivery surface (40) with which each of the impellers (20, 26, 32) delivers the medium, wherein the filling unit (10) is configured in such a manner that the feeding wheel (30) is configured to connect and disconnect from a delivery path of the medium to be metered by movement created by a device.

2. The filling unit (10) according to claim 1, wherein the vanes (22, 28, 34) of the filling wheel (14), the metering wheel (24) and/or the feeding wheel (30) are configured such that a delivery surface (40) of the respective vanes (22, 28, 34) can be varied in shape.

3. The filling unit (10) according to claim 2, wherein the shape of the delivery surface (40) can be modified by a rotation of the vanes (22, 28, 34) of the filling wheel (14), the metering wheel (24) and/or the feeding wheel (30) about respective axes of extension (38), or by a variable inclination of the vanes (22, 28, 34) of the filling wheel (14), the metering wheel (24) and/or the feeding wheel (30) with respect to a radial direction (45) extending from an axis of rotation (42) of the respective impellers (20, 26, 32), or by a variable curvature of the vanes (22, 28, 34) of the filling wheel (14), the metering wheel (24) and/or the feeding wheel (30).

4. The filling unit (10) according to claim 1, wherein the vanes (22, 28, 34) of the filling wheel (14), the metering wheel (24) and/or the feeding wheel (30) are configured to be displaceable parallel to an axis of rotation (42) of the given impeller (20, 26, 32).

5. The filling unit (10) according to claim 1, wherein the vanes (22, 28, 34) of the filling wheel (14), the metering wheel (24) and/or the feeding wheel (30) have a triangular, rectangular, or at least partially rounded cross section.

6. The filling unit (10) according to claim 1, wherein the vanes (22, 28, 34) of the filling wheel (14), the metering wheel (24) and/or the feeding wheel (30) have a consistent cross section along at least one region of their respective axes of extension (38).

7. The filling unit (10) according to claim 1, wherein the vanes (22, 28, 34) of the filling wheel (14), the metering wheel (24) and/or the feeding wheel (30) are configured to be exchangeable.

8. The filling unit (10) according to claim 1, wherein the filling wheel (14), the metering wheel (24) and/or the feeding wheel (30) each has/have vanes (22, 28, 34) with a different cross section along their respective axes of extension (38).

9. The filling unit (10) according to claim 1, wherein the vanes (22, 28, 34) of the filling wheel (14), the metering wheel (24) and/or the feeding wheel (30) are arranged such that an extension of respective axes of extension (38) runs at a distance from an axis of rotation (42) of the given impeller (20, 26, 32).

10. The filling unit (10) according to claim 1, wherein the filling unit (10) is designed such that a direction of rotation and/or a rotational speed of the filling wheel (14), the metering wheel (24) and/or the feeding wheel (30) can be varied.

11. The filling unit (10) according to claim 1, wherein the filling unit (10) has at least one electric motor (50), and the filling wheel (14), the metering wheel (24) and/or the feeding wheel (30) is/are driven directly or via at least one gearwheel (48) by the electric motor (50), and/or a rotational position of the vanes (22, 28, 34) and/or an inclination of the vanes (22, 28, 34) is varied directly or via at least one gearwheel (46) by the electric motor (50), with respect to a radial direction (45) extending from an axis of rotation (42) of the respective impeller (20, 26, 32).

12. The filling unit (10) according to claim 1, wherein the device for moving the feeding wheel (30) is a pivoting device (33) for creating a pivoting movement.

13. The filling unit (10) according to claim 12, wherein the pivoting movement is about an axis of rotation (42) of the metering wheel (24).

14. The filling unit (10) according to claim 6, wherein the vanes (22, 28, 34) of the filling wheel (14), the metering wheel (24) and/or the feeding wheel (30) have a consistent cross section along their entire respective axes of extension (38).

15. The filling unit (10) according to claim 11, wherein the at least one electric motor (50) is a servomotor (52).

16. The filling unit (10) according to claim 7, wherein the vanes (22, 28, 34) of the filling wheel (14), the metering wheel (24) and/or the feeding wheel (30) are configured to be exchangeable elements between the individual impellers (20, 26, 32).

17. A method for providing an optimized rotary press, comprising the steps of:

providing a first rotary press (12) having an adjustable filling unit (10), the adjustable filling unit (10) having at least one element with at least one adjustable configuration parameter;

producing a plurality of tablets with the first rotary press (12) with different settings of the configuration parameter;

analyzing the produced tablets for desired properties to identify a tablet with preferred properties among the produced tablets;

identifying a setting of the configuration parameter in which the tablet with preferred properties was produced;

providing at least one second rotary press having an optimized filling unit, wherein the optimized filling unit has at least one element with a fixed, prespecified configuration parameter with which the tablet with preferred properties was produced, wherein the adjustable filling unit comprises:

a filling wheel (14) configured to fill a medium to be metered into die holes (16) of a die plate (18) of the rotary press (12); wherein the filling wheel (14) is configured as an impeller (20) and is configured to deliver the medium to be metered via a rotating movement by its vanes (22);

a metering wheel (24) configured to meter a quantity of medium to be metered into the respective die holes (16) of the die plate (18), wherein the metering wheel (24) is configured as an impeller (26) and is configured to meter the quantity of the medium to be metered and to remove excess medium by scraping over the die holes (16) of the die plate (18) with its vanes (28) via a rotating movement;

a feeding wheel (30) configured to feed the medium to be metered to the filling wheel (14), wherein the feeding wheel (30) is configured as an impeller (32) and is configured to deliver the medium to be supplied to the filling wheel (14) via a rotating movement by its vanes (34);

at least one medium supply unit (36) which is designed to supply the medium to the filling wheel (14) and/or the feeding wheel (30), wherein the vanes (22, 28, 34) of the filling wheel (14), the metering wheel (24) and/or the feeding wheel (30) each have a delivery surface (40) with which each of the impellers (20, 26, 32) delivers the medium, wherein the filling unit (10) is configured in such a manner that the feeding wheel (30) is configured to connect and disconnect from a delivery path of the medium to be metered by movement created by a device.

18. The method according to claim 17, wherein the adjustable configuration parameter is a direction of rotation or a rotational speed of the filling wheel (14), the metering wheel (24) and/or the feeding wheel (30), or a shape of delivery surfaces (40) of the vanes (22, 28, 34), wherein the shape of the delivery surfaces (40) is variable by a rotation of the vanes (22, 28, 34) about their respective axes of extension (38), or by an inclination of the vanes (22, 28, 34) with respect to a radial direction (45) extending from an axis of rotation (42) of the respective impeller (20, 26, 32), or by varying a curvature of the vanes (22, 28, 34), or connecting/disconnecting the feeding wheel (30) to or from the delivery path of the medium to be metered.

19. The method according to claim 17, wherein in the step of producing tablets with the first rotary press (12), settings for multiple configuration parameters are changed at the same time.

\* \* \* \* \*